(12) United States Patent
Kodgers

(10) Patent No.: US 10,535,023 B1
(45) Date of Patent: Jan. 14, 2020

(54) PLANNING AND CONDUCTING A PRODUCT LAUNCH

(71) Applicant: UNITED PARCEL SERVICE OF AMERICA, INC., Atlanta, GA (US)

(72) Inventor: Ken Kodgers, Atlanta, GA (US)

(73) Assignee: UNITED PARCEL SERVICE OF AMERICA, INC., Atlanta, GA (US)

( * ) Notice: Subject to any disclaimer, the term of this patent is extended or adjusted under 35 U.S.C. 154(b) by 837 days.

(21) Appl. No.: 15/087,099

(22) Filed: Mar. 31, 2016

Related U.S. Application Data

(60) Provisional application No. 62/141,404, filed on Apr. 1, 2015.

(51) Int. Cl.
G06Q 10/00 (2012.01)
G06Q 10/06 (2012.01)
G06Q 10/08 (2012.01)

(52) U.S. Cl.
CPC ..... G06Q 10/06311 (2013.01); G06Q 10/083 (2013.01)

(58) Field of Classification Search
None
See application file for complete search history.

(56) References Cited

U.S. PATENT DOCUMENTS

| | | | | |
|---|---|---|---|---|
| 2004/0002884 A1* | 1/2004 | Lenio | ............... | G06Q 10/06316 705/7.26 |
| 2004/0064351 A1* | 4/2004 | Mikurak | ............... | G06Q 10/087 705/22 |
| 2007/0203770 A1* | 8/2007 | Grosvenor | ............. | G06Q 10/04 705/7.11 |
| 2012/0054095 A1* | 3/2012 | Lesandro | ............... | G06Q 20/10 705/39 |
| 2012/0089410 A1* | 4/2012 | Mikurak | ................ | G06Q 10/00 705/1.1 |

(Continued)

OTHER PUBLICATIONS

DHL, "Product Launches", May 17, 2010 to Jun. 30, 2016, Internet Archive <http://www.dhl.com/en/logistics/industry_sector_solutions/consumer_logistics/product_launches.html>, 2 pages.

(Continued)

Primary Examiner — Joseph M Waesco
(74) Attorney, Agent, or Firm — Shook, Hardy & Bacon L.L.P.

(57) ABSTRACT

An example embodiment provides a method comprising determining a launch date; determining a product launch plan by working back from the launch date, executing the product launch plan, and tracking the plurality of the product as they are transported in accordance with the product launch plan. The product launch plan comprises a configurable visibility threshold point. The method further comprises receiving a tracking request and determining whether the execution of the product launch plan has reached the configurable visibility threshold point. Responsive to determining that the execution of the product launch plan has reached the configurable visibility threshold point, providing tracking information/data. Responsive to determining that the execution of the product launch plan has not reached the configurable visibility threshold point, providing a message indicating that the expected delivery date of the product is the launch date.

21 Claims, 6 Drawing Sheets

(56) References Cited

U.S. PATENT DOCUMENTS

| | | | | |
|---|---|---|---|---|
| 2012/0303498 A1* | 11/2012 | Cova | ............... | G06Q 10/08 |
| | | | | 705/34 |
| 2012/0310854 A1* | 12/2012 | Cova | ............... | G06Q 10/06 |
| | | | | 705/333 |
| 2013/0218702 A1* | 8/2013 | Lv | ............... | G06Q 10/04 |
| | | | | 705/26.1 |
| 2014/0258032 A1* | 9/2014 | Psota | ............... | G06Q 30/02 |
| | | | | 705/26.35 |
| 2015/0046363 A1* | 2/2015 | McNamara | ....... | G06Q 10/0635 |
| | | | | 705/333 |
| 2015/0089270 A1* | 3/2015 | Jeong | ............... | G06F 21/31 |
| | | | | 714/3 |
| 2015/0134557 A1* | 5/2015 | Cova | ............... | G06Q 10/06 |
| | | | | 705/333 |
| 2015/0154526 A1* | 6/2015 | Yates | ............. | G06Q 10/06393 |
| | | | | 705/7.39 |
| 2015/0269617 A1* | 9/2015 | Mikurak | ............. | G06Q 10/087 |
| | | | | 705/14.54 |

OTHER PUBLICATIONS

DHL, "Launch New Products Successfully", Jun. 1, 1010 to Jun. 30, 2016, Internet Archive <http://www.dhl.com/en/logistics/industry_sector_solutions/life_sciences_and_healthcare_logistics/launch_new_products_successfully.html>, 2 pages.

DHL, "DHL Supply Chain, Product Launch", *Life Sciences*, retrieved from <http://www.dhl.com/content/dam/downloads/g0/logistics/case_studies/product%20launch_consumer_dhl.pdf> on Dec. 19, 2010, 2 pages.

* cited by examiner

| Customer: | <insert account name and primary contact here> | | | Product: | <insert text here> | |
|---|---|---|---|---|---|---|
| Carrier Scope | <insert text here> | | | | Basic Account Information | |
| | | | | Account number(s) | Annual Volume | |
| ☐ Int'l Air Freight | ☐ Ocean Freight | ☐ Domestic Small Pk | ☐ Capital | <insert account number(s) here> | Annual Revenue | |
| ☐ Int'l TL/LTL | ☐ Domestic Air Freight | ☐ Security | ☐ Carrier Store | | Gainer/Decliner | |
| ☐ Int'l Small Pk | ☐ Domestic TL/LTL | ☐ Contract Logistics | ☐ Consignee Services | | 1st Product Launch (Y/N) | |

| | | |
|---|---|---|
| Finished goods country of origin / city | <insert text here> | Launch Strategy |
| Finished goods manufacturer | <insert text here> | Distribution |
| Expected volume | <insert text here> | ☑ In-House ☐ Carrier ☐ 3rd Party ☐ Combination |
| | | Notes |
| Value of goods | <insert text here> | Launch Day Channels |
| International freight carrier(s) | SX, CX, CA | ☑ Customer Retail ☑ 3rd Party Retail ☑ D2C |
| Destination regions | EMEA & AMR | Notes |
| Destination countries | UK, DE, FR, NL, US, CA | Launch Dates |
| Volume by destination country | <insert text here> | ☑ Day Specific ☐ Phased by geo ☑ Phased by channel ☐ Other |
| Noteworthy trade restrictions | <insert text here> | Notes <insert dates here> |
| Company accepting/processing goods | <insert text here> | Delivery |
| Plans for inventory staging | <insert text here> | ☑ Signature Req. ☐ Consignee Services ☑ Visibility Override ☐ COD ☐ Other |
| Security plans | <insert text here> | Notes |
| Domestic carriers used | <insert text here> | |

FIG. 5

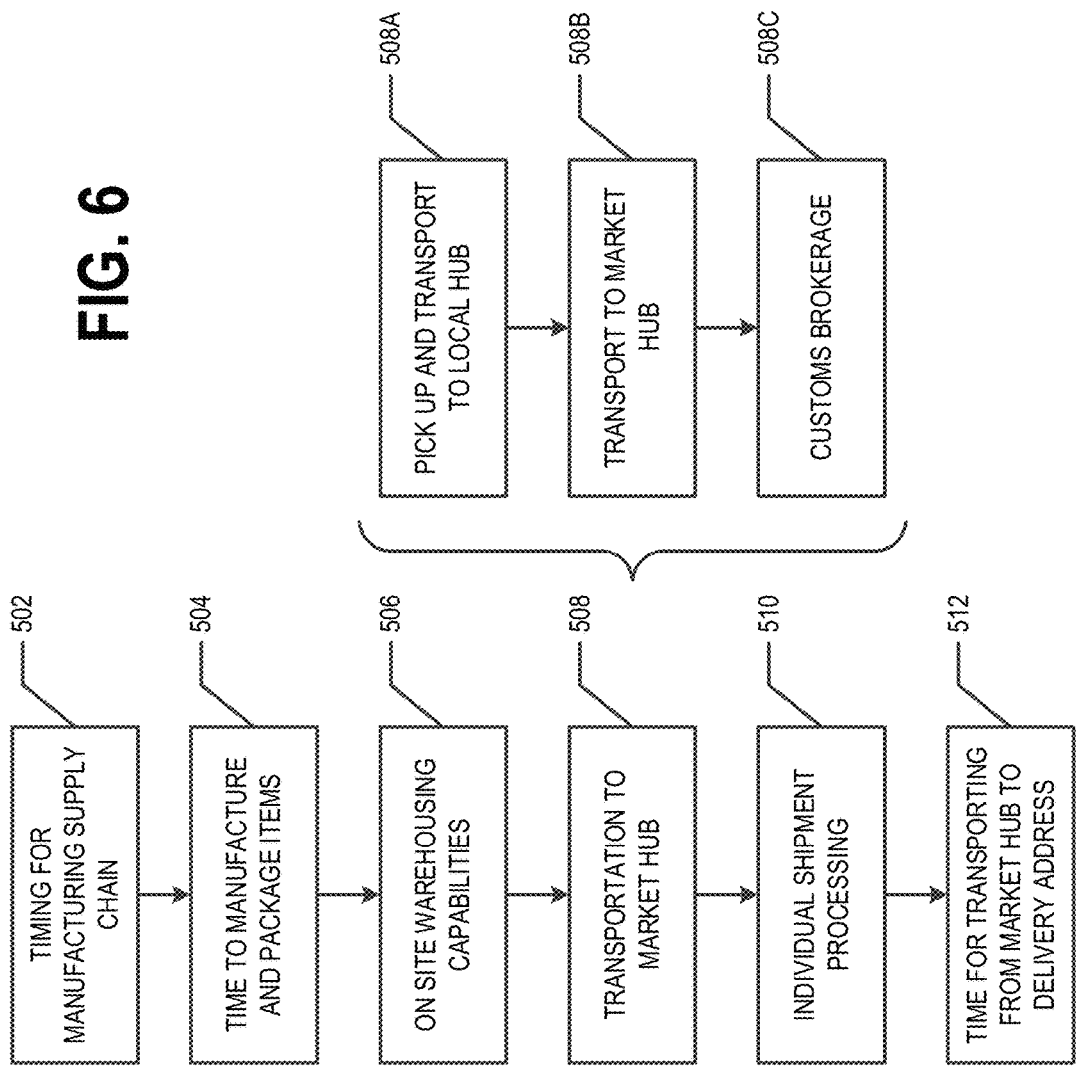

US 10,535,023 B1

PLANNING AND CONDUCTING A PRODUCT LAUNCH

CROSS-REFERENCE TO RELATED APPLICATIONS

This application claims priority to U.S. Provisional Application No. 62/141,404 filed Apr. 1, 2015, which is hereby incorporated herein in its entirety by reference.

BACKGROUND

Companies introducing new products to target markets (e.g., a particular city, state, region, country, international, or global market) may choose to introduce their new product via a product launch. For example, a company may choose to make the new product available in retail stores throughout the target market, via home delivery, and/or the like on a predetermined product launch date. Coordinating delivery of retail supplies and home deliveries of the new product on the product launch date throughout the target market raises a number of challenges.

A need exists in the art for methods, apparatuses, systems, and computer program products for planning and conducting a product launch.

BRIEF SUMMARY

In general, embodiments of the present invention provide methods, apparatus, systems, computing devices, computing entities, and/or the like for the improved planning and conducting of a product launch occurring on a predetermined product launch date.

According to one aspect of the present invention, a method is provided. In an example embodiment, the method comprises determining a launch date for a product launch. A plurality of a product are to be delivered to a plurality of customers at different geographic locations on the launch date. The method further comprises determining a product launch plan for delivering the plurality of the product to the plurality of customers at different geographic locations by working back from the launch date. The product launch plan comprises a configurable visibility threshold point. The method further comprises executing the product launch plan and tracking one or more of the plurality of the product as the one or more of the plurality of the product is transported in accordance with the product launch plan. A tracking request is received from one of the plurality of customers who is an intended recipient of at least one of the one or more of the plurality of the product. The tracking request is provided as user input to a user interface provided through a customer computing entity. The method further comprises determining whether the execution of the product launch plan has reached the configurable visibility threshold point. Responsive to determining that the execution of the product launch plan has reached the configurable visibility threshold point, tracking information/data is provided to be displayed by the user interface provided by the customer computing device. Responsive to determining that the execution of the product launch plan has not reached the configurable visibility threshold point, a message is provided (a) to be displayed by the user interface provided by the customer computing entity and (b) indicating that the expected delivery date of the at least one of the one or more of the plurality of the product is the launch date.

According to another aspect of the present invention, an apparatus is provided. In an example embodiment, the apparatus comprises at least one processor and at least one memory storing computer program code. The at least one memory and the computer program code are configured to, with the processor, cause the apparatus to at least determine a launch date for a product launch; determine a product launch plan for delivering the plurality of a product to the plurality of customers at different geographic locations by working back from the launch date; execute the product launch plan and track one or more of the plurality of the product as the one or more of the plurality of the product is transported in accordance with the product launch plan. For example, a plurality of the product are to be delivered to a plurality of customers at different geographic locations on the launch date. For example, the product launch plan comprises a configurable visibility threshold point. The at least one memory and the computer program code are configured to, with the processor, cause the apparatus to at least receive a tracking request from one of the plurality of customers who is an intended recipient of at least one of the one or more of the plurality of the product, the tracking request provided as user input to a user interface provided through a customer computing entity and determine whether the execution of the product launch plan has reached the configurable visibility threshold point. Responsive to determining that the execution of the product launch plan has reached the configurable visibility threshold point, the at least one memory and the computer program code are configured to, with the processor, cause the apparatus to at least provide tracking information/data to be displayed by the user interface provided by the customer computing device. Responsive to determining that the execution of the product launch plan has not reached the configurable visibility threshold point, the at least one memory and the computer program code are configured to, with the processor, cause the apparatus to at least provide a message (a) to be displayed by the user interface provided by the customer computing entity and (b) indicating that the expected delivery date of the at least one of the one or more of the plurality of the product is the launch date.

According to yet another aspect of the present invention, a computer program product is provided. In an example embodiment, the computer program product comprises at least one non-transitory computer-readable storage medium having computer-executable program code instructions stored therein. The computer-executable program code instructions comprising program code instructions configured to determine a launch date for a product launch; determine a product launch plan for delivering the plurality of a product to the plurality of customers at different geographic locations by working back from the launch date; and execute the product launch plan and track one or more of the plurality of the product as the one or more of the plurality of the product is transported in accordance with the product launch plan. For example, a plurality of the product are to be delivered to a plurality of customers at different geographic locations on the launch date. For example, the product launch plan comprises a configurable visibility threshold point. The computer-executable program code instructions comprise program code instructions configured to receive a tracking request from one of the plurality of customers who is an intended recipient of at least one of the one or more of the plurality of the product, the tracking request provided as user input to a user interface provided through a customer computing entity and determine whether the execution of the product launch plan has reached the configurable visibility threshold point. The computer-executable program code instructions comprise program code instructions configured to, responsive to determining that the execution of the product launch plan has reached the configurable visibility threshold point, provide tracking information/data to be displayed by the user interface provided by the customer computing device. The computer-executable program code instructions comprise program code instructions configured to responsive to determining that the execution of the product launch plan has not reached the configurable visibility threshold point, provide a message (a) to be displayed by the user interface provided by the customer computing entity and (b) indicating that the expected delivery date of the at least one of the one or more of the plurality of the product is the launch date.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 5 is an example view of a product planning user interface, in accordance with an embodiment of the present invention; and FIG. 6 is a flowchart illustrating operations and processes that can be used in the planning of a product launch in accordance with various embodiments of the present invention.

DETAILED DESCRIPTION

Figure 1:
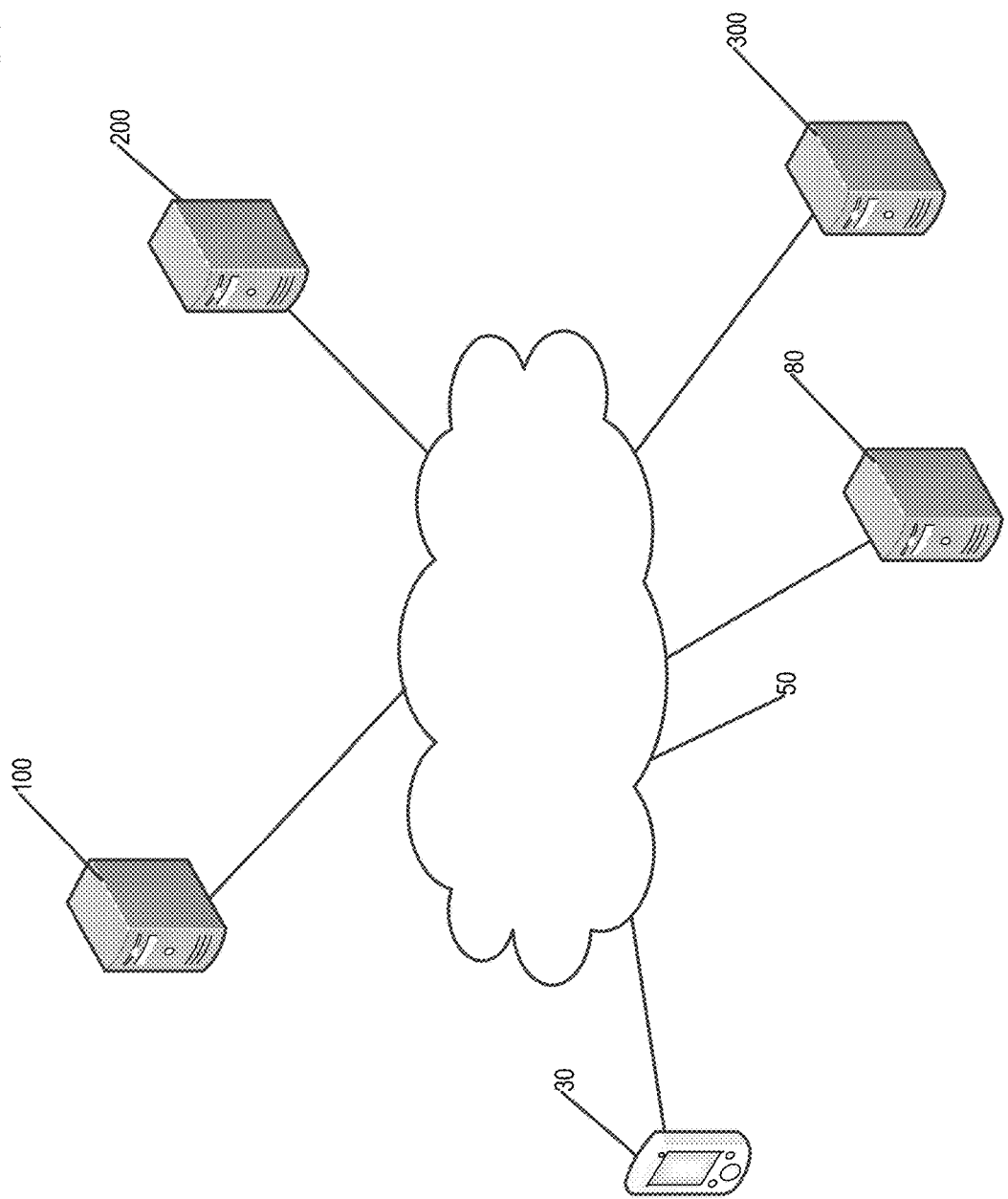
FIG. 1 is an overview of a system that can be used to practice embodiments of the present invention.

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. And terms are used both in the singular and plural forms interchangeably. Like numbers refer to like elements throughout.

I. Computer Program Products, Methods, and Computing Entities

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. General Overview

Embodiments of the present invention are directed to improving planning and conducting a product launch. In various embodiments, one or more customer, carrier, and/or third-party product launch company personnel may provide one or more planning parameters for executing a product launch. For example, planning parameters may comprise the product launch date, market forecasts related to the product launch, product information, target market, location of manufacture, customs information/data relevant to product, launch strategy parameters, desired tracking visibility for consignees, and/or the like. Based on one or more planning parameters, various aspects of the product launch plan may be generated and/or determined. Updated planning parameters and information/data may also be provided by one or more customer, carrier, and/or third-party product launch company personnel and used to update the product launch plan. The product launch may then be conducted in accordance with the product launch plan. In various embodiments, updated planning parameters and information/data may be provided during the product launch and the product launch plan may be updated dynamically.

III. Exemplary System Architecture

FIG. 1 provides an illustration of an exemplary architecture for an embodiment of the present invention. As shown in FIG. 1, this particular embodiment may include one or more launch systems 100, one or more networks 50, one or more user computing entities 30, one or more customer systems 200, and one or more carrier systems 300. Some embodiments may further comprise one or more customs computing systems 80. Each of these components, entities, devices, systems, and similar words used herein interchangeably may be in direct or indirect communication with, for example, one another over the same or different wired or wireless networks. Additionally, while FIG. 1 illustrates the various system entities as separate, standalone entities, the various embodiments are not limited to this particular architecture. For example, in one embodiment, the launch system 100 and the carrier system 300 may be integrated.

1. Exemplary Launch Systems 100

Figure 2:
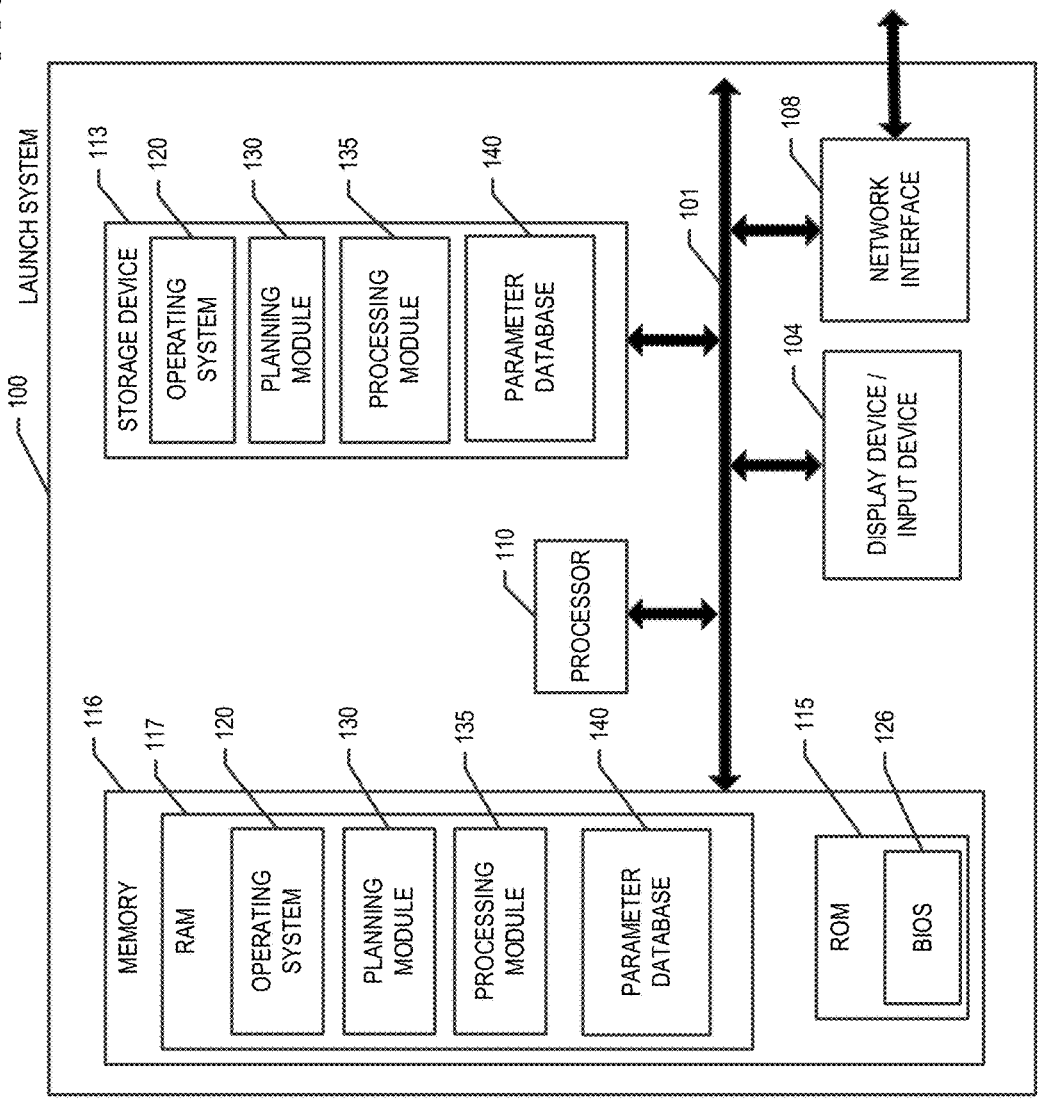
FIG. 2 is an exemplary schematic diagram of a launch system according to one embodiment of the present invention.

A launch system 100 may be operated by and/or on behalf of a carrier, a company preparing to launch a new product, a third party consultant, and/or the like. A carrier may be a traditional carrier, such as United Parcel Service (UPS), FedEx, DHL, courier services, the United States Postal Service (USPS), Canadian Post, freight companies (e.g. truck-load, less-than-truckload, rail carriers, air carriers, ocean carriers, etc.), and/or the like. In various embodiments, multiple launch systems 100 may be used to assist with the planning and/or conducting of a product launch. In some embodiments, a launch system 100 may be associated with and/or a sub-system of a customer system 200 and/or a carrier system 300. In other embodiments, the launch system 100 may be independent of the customer system 200 and/or carrier system 300. FIG. 2 shows a schematic diagram of an example launch system 100. In general, the term system may refer to, for example, one or more computers, computing devices, computing entities, mobile phones, desktops, tablets, notebooks, laptops, distributed systems, servers, blades, gateways, switches, processing devices, processing entities, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the launch system 100 may also include one or more communications interfaces for communicating with various computing entities, such as by communicating data, content, information, and/or similar terms used herein interchangeably that can be transmitted, received, operated on, processed, displayed, stored, and/or the like. For instance, the launch system 100 may communicate with one or more user computing entities 30, one or more customer systems 200, and/or one or more carrier systems 300.

In one embodiment, the launch system 100 may include or be in communication with one or more processing elements 110 (also referred to as processors, processing circuitry, and/or similar terms used herein interchangeably) that communicate with other elements within the launch system 100 via a bus 101, for example. As will be understood, the processing element 110 may be embodied in a number of different ways. For example, the processing element may be embodied as one or more complex programmable logic devices (CPLDs), microprocessors, multi-core processors, coprocessing entities, application-specific instruction-set processors (ASIPs), and/or controllers. Further, the processing element 110 may be embodied as one or more other processing devices or circuitry. The term circuitry may refer to an entirely hardware embodiment or a combination of hardware and computer program products. Thus, the processing element 110 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 110 may be configured for a particular use or configured to execute instructions stored in volatile or non-volatile media or otherwise accessible to the processing element. As such, whether configured by hardware or computer program products, or by a combination thereof, the processing element 110 may be capable of performing steps or operations according to embodiments of the present invention when configured accordingly.

In one embodiment, the launch system 100 may further include memory or be in communication with memory 116, which may comprise non-volatile media (also referred to as non-volatile storage, memory, memory storage, memory circuitry and/or similar terms used herein interchangeably). In one embodiment, the non-volatile storage or memory 116 may include one or more non-volatile storage or memory media as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. For example, the non-volatile storage or memory may store code including planning module 130 and/or processing module 135. The term database, database instance, database management system, and/or similar terms used herein interchangeably may refer to a structured collection of records or data that is stored in a computer-readable storage medium, such as via a relational database, hierarchical database, and/or network database. For example, the non-volatile storage or memory may comprise a parameter database 140.

In one embodiment, the memory 116 may further comprise volatile media (also referred to as volatile storage, memory, memory storage, memory circuitry and/or similar terms used herein interchangeably). In one embodiment, the volatile storage or memory may also include one or more volatile storage or memory media as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element. Thus, the databases, database instances, database management systems, data, applications, programs, program modules, scripts, source code, object code, byte code, compiled code, interpreted code, machine code, executable instructions, and/or the like may be used to control certain aspects of the operation of the launch system 100 with the assistance of the processing element 110 and operating system 120.

In various embodiments, memory 116 can be considered primary memory such as RAM memory or other forms which retain the contents only during operation, or it may be a non-volatile memory, such as ROM, EPROM, EEPROM, FLASH, or other types of memory that retain the memory contents. In some embodiments, the disk storage may communicate with the processor 110 using an I/O bus instead of a dedicated bus. The memory 116 could also be secondary memory, such as disk storage, that stores a relatively large amount of data. The secondary memory may be a floppy disk, hard disk, compact disk, DVD, or any other type of mass storage type known to those skilled in the computer arts. The memory 116 may also comprise any application program interface, system, libraries and any other data by the processor to carry out its functions. ROM 115 is used to store a basic input/output system 126 (BIOS), containing the basic routines that help to transfer information/data between components of the launch system 100, including the planning module 130, the processing module 135, the parameter database 140, and/or the operating system 120.

In addition, the launch system 100 includes at least one storage device 113, such as a hard disk drive, a floppy disk drive, a CD-ROM drive, or optical disk drive, for storing information/data on various computer-readable media, such as a hard disk, a removable magnetic disk, or a CD-ROM disk. As will be appreciated by one of ordinary skill in the art, each of these storage devices 113 is connected to the system bus 101 by an appropriate interface. It is important to note that the computer-readable media described above could be replaced by any other type of computer-readable media known in the art. Such media include, for example, memory sticks (e.g., USB memories), magnetic cassettes, flash memory cards, digital video disks, and Bernoulli cartridges.

A number of program modules may be stored by the various storage devices and within RAM 117. Such program modules include the operating system 120, the planning module 130, and/or the processing module 135. Those skilled in the art will appreciate that other modules may be present in RAM 117 to effectuate the various embodiments of the present invention. Furthermore, the functions of the planning module 130 and/or the processing module 135 need not be modular.

Also located within the launch system 100 is a network interface 108, for interfacing and communicating with other elements of a computer network, such as by communicating data, content, information, and/or similar terms used herein interchangeably that can be transmitted, received, operated on, processed, displayed, stored, and/or the like. For instance, the launch system 100 may be in communication with one or more user computing entities 30, one or more customer systems 200, and/or one or more carrier systems 300. Such communication may be executed using a wired data transmission protocol, such as fiber distributed data interface (FDDI), digital subscriber line (DSL), Ethernet, asynchronous transfer mode (ATM), frame relay, data over cable service interface specification (DOC SIS), or any other wired transmission protocol. Similarly, the launch system 100 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), 802.16 (WiMAX), ultra wideband (UWB), infrared (IR) protocols, Bluetooth protocols, wireless universal serial bus (USB) protocols, and/or any other wireless protocol.

Various information/data can be received by the launch system 100 via the network interface 108 and/or input/output device 104. This information/data may include information/data related to the product to be launched, information/data related to consumers and retailers to whom products are to be delivered, product launch security concerns, customs regulations, shipment status information/data (e.g., location (full address, GPS coordinates), containerization (carton, skid, pallet, ULD, truck, plane, building, package car), date/time stamp, any exception to planned flow, package level data, and/or the like) and/or the like. This input information/data may vary, however, depending on the configuration and informational requirements of the launch system 100.

As mentioned above, the launch system 100 also includes an input/output device 104 for receiving and displaying data. The launch system 100 may include or be in communication with one or more input elements, such as a keyboard input, a mouse input, a touch screen/display input, audio input, pointing device input, joystick input, keypad input, and/or the like, as indicated by input/output device 104. The launch system 100 may also include or be in communication with one or more output elements, as indicated by input/output device 104, such as audio output, video output, screen/display output, motion output, movement output, and/or the like.

In various embodiments, the launch system 100 may be configured to plan and/or coordinate a product launch. The launch system 100 may be further configured to access information/data related to an product being launched, consumers and retailers to whom products are to be delivered on the launch date, customs regulations that may be relevant to the product, warehousing and/or security concerns relevant to the product, and/or the like. For example, in various embodiments, the launch system 100 may be configured to coordinate the pre-positioning of product and retaining product at a carrier facility closer to the consignee (e.g., closer to a target market) reducing strain on the supply chain solution and transportation network and helping to enable delivery on a single day (e.g., the launch date). In various embodiments, the launch system 100 may be configured to access information/data via one or more customer systems 200, carrier systems 300, and/or the like (e.g., shipment status information, etc.). The launch system 100 may be configured to be in communication with one or more user computing entities 30, one or more customer systems 200, one or more carrier systems 300, and/or one or more customs computing systems 80.

The launch system 100 may also comprise, be associated with, or be in communication with various other internal systems, such as systems for coordinating transportation resources, systems related to customs brokerage, security systems, systems for providing shipment visibility and/or tracking, and a variety of other systems and their corresponding components.

Those skilled in the art will recognize that many other alternatives and architectures are possible and can be used to practice various embodiments of the invention. The embodiment illustrated in FIG. 2 can be modified in different ways or incorporated within a network and be within the scope of the invention. For example, one or more components of the launch system 100 may be located remotely from other launch system 100 components, such as in a distributed system. Furthermore, one or more of the components may be combined and additional components performing functions described herein may be included or associated with the launch system 100. Thus, the launch system 100 can be adapted to accommodate a variety of needs and circumstances.

2. Exemplary User Computing Entities 30

Figure 3:
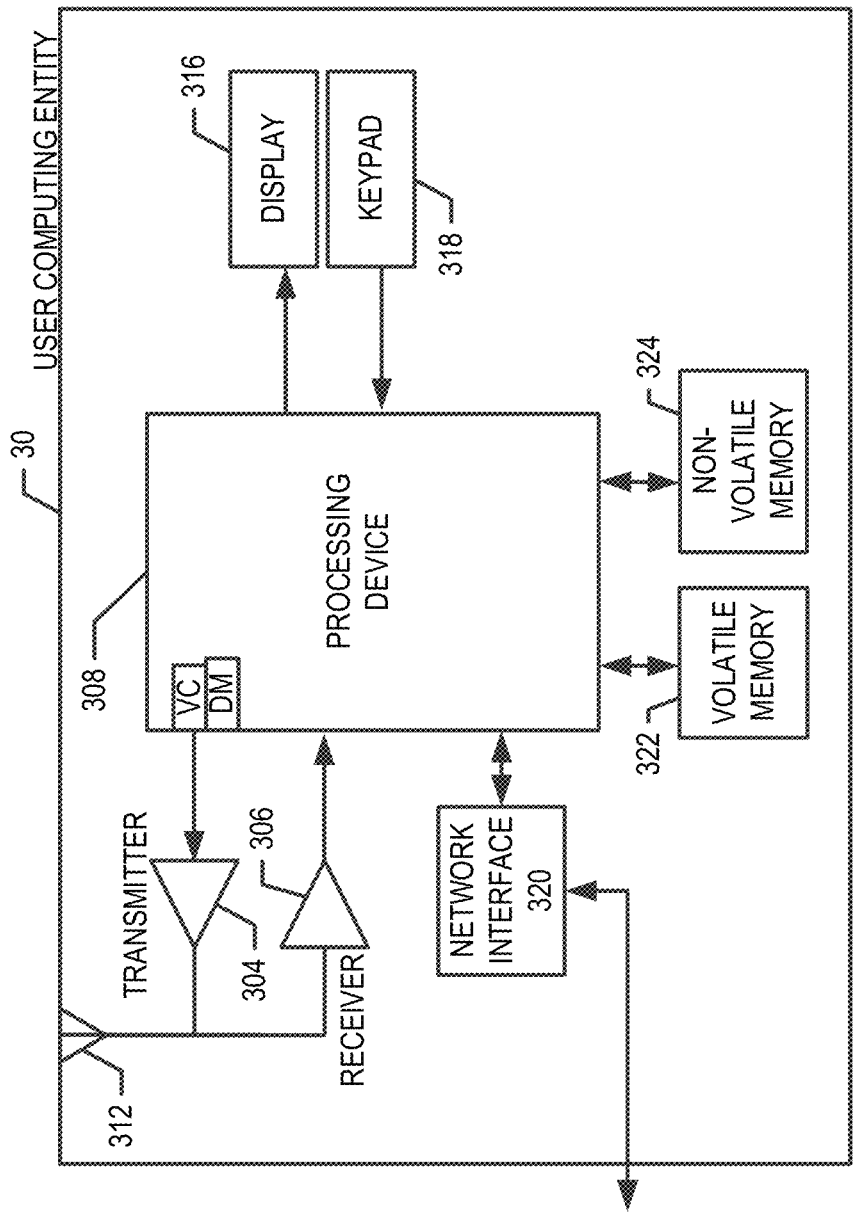
FIG. 3 is an exemplary schematic diagram of a user computing entity according to one embodiment of the present invention.

A user may be a consumer, retailer, distributor, consignee, and/or the like to whom one or more of the product is to be delivered on the launch day. For example, in one context, a user may be an individual who has pre-ordered the product, a retailer who will sell the product at one or more store front locations and/or via e-commerce, or a distributor who will warehouse the product and/or provide the product to consumers and/or retailers. A user computing entity 30 may be any computing entity operated by and/or on behalf of a user. To do so, a user or user's agent may operate a user computing entity 30 that includes one or more components that are functionally similar to those of the launch system 100. FIG. 3 provides an illustrative schematic representative of a user computing entity 30 that can be used in conjunction with embodiments of the present invention. In general, the terms device, system, computing entity, entity, and/or similar words used herein interchangeably may refer to, for example, one or more computers, computing entities, desktops, mobile phones, smartphones, tablets, phablets, notebooks, laptops, distributed systems, gaming consoles (e.g., Xbox, Play Station, Wii), portable game consoles (e.g., Game Boy, Nintendo DS), watches, glasses, key fobs, radio frequency identification (RFID) tags, ear pieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein.

As shown in FIG. 3, the user computing entity 30 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, respectively.

The signals provided to and received from the transmitter 304 and the receiver 306, respectively, may include signaling information/data in accordance with air interface standards of applicable wireless systems. In this regard, the user computing entity 30 may be capable of operating with one or more air interface standards, communication protocols, modulation types, and access types. More particularly, the user computing entity 30 may operate in accordance with any of a number of wireless communication standards and protocols, such as those described above with regard to the launch system 100. In a particular embodiment, the user computing entity 30 may operate in accordance with multiple wireless communication standards and protocols, such as UMTS, CDMA2000, 1×RTT, WCDMA, TD-SCDMA, LTE, E-UTRAN, EVDO, HSPA, HSDPA, Wi-Fi, WiMAX, UWB, IR, NFC, Bluetooth, USB, and/or the like. Similarly, the user computing entity 30 may operate in accordance with multiple wired communication standards and protocols, such as those described above with regard to the launch system 100 via a network interface 320.

Via these communication standards and protocols, the user computing entity 30 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The user computing entity 30 can also download changes, add-ons, and updates, for instance, to its firmware, software (e.g., including executable instructions, applications, program modules), and operating system.

According to one embodiment, the user computing entity 30 may include a location determining aspects, device, module, functionality, and/or similar words used herein interchangeably. For example, the user computing entity 30 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites. The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, global positioning systems (GPS), and/or the like. Alternatively, the location information/data can be determined by triangulating the user computing entity's 30 position in connection with a variety of other systems, including cellular towers, Wi-Fi access points, accelerometers, gyroscopes, and/or the like. Similarly, the user computing entity 30 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The user computing entity 30 may also comprise a user interface (that can include a display 316 coupled to a processing element 308) and/or a user input interface (coupled to a processing element 308). For example, the user interface may be a mobile application, a user application, browser, user interface, and/or similar words used herein interchangeably executing on and/or accessible via the user computing entity 30 to interact with and/or cause display of information/data from the launch system 100, as described herein. The user input interface can comprise any of a number of devices allowing the user computing entity 30 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the user computing entity 30 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The user computing entity 30 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the user computing entity 30. As indicated, this may include a user application that is resident on the entity or accessible through a browser or other user interface for communicating with the launch system 100 and/or various other computing entities. For example, a user may use the user computing entity 30 to access a user interface provided by a carrier system 300 and/or a launch system 100 configured to provide visibility and/or tracking information/data related to the shipment and/or delivery of a product to the user by the carrier.

In another embodiment, the user computing entity 30 may include one or more components or functionality that are the same or similar to those of the launch system 100, as described in greater detail above. As will be recognized, these architectures and descriptions are provided for exemplary purposes only and are not limiting to the various embodiments.

3. Exemplary Customer Systems 200

In one embodiment, a company, organization, corporation, and/or the like and/or employees and/or agents of the company, organization, corporation and/or the like may operate one or more customer systems 200. For example, a company preparing to launch a new product may operate one or more customer systems 200. A customer system 200 may include one or more components that are functionally similar to those of the launch system 100 and/or the user computing entity 30. For example, in one embodiment, each customer system 200 may include one or more processing elements (e.g., CPLDs, microprocessors, multi-core processors, coprocessing entities, ASIPs, microcontrollers, and/or controllers), one or more display device/input devices (e.g., including user interfaces), volatile and non-volatile storage or memory, and/or one or more communications interfaces. For example, the launch system 100 may communicate or interact with any number of customer systems 200 via their respective communication interfaces information/data. This may also enable the customer system 200 to communicate with various other computing entities, such as user computing entities 30, carrier systems 300, and/or various other computing entities. As will be recognized, these architectures and descriptions are provided for exemplary purposes only and are not limiting to the various embodiments.

4. Exemplary Carrier Systems 300

In various embodiments, one or more carrier systems 300 may be operated by and/or on behalf of a carrier (e.g., United Parcel Service (UPS), United States Postal Service (USPS), FedEx, private carrier, regional carrier, and/or the like). In various embodiments, the carrier systems 300 may be configured to coordinate, schedule, track, facilitate, and/or the like the pick-up, transportation, and delivery of packages, parcels, shipments, and/or the like. For example, a carrier system 300 may be configured to coordinate, schedule, track, facilitate, and/or the like one or more delivery vehicle pick-up and/or delivery routes. A carrier system 300 may be configured to coordinate processing, tracking, and/or the like of products, packages, parcels, shipments, items, and/or the like being transported through one or more carrier hubs, warehouses, transportation networks, facilities, and/or the like.

A carrier system 300 may include one or more components that are functionally similar to those of the launch system 100 and/or the user computing entity 30. For example, in one embodiment, each carrier system 300 may include one or more processing elements (e.g., CPLDs, microprocessors, multi-core processors, coprocessing entities, ASIPs, microcontrollers, and/or controllers), one or more display device/input devices (e.g., including user interfaces), volatile and non-volatile storage or memory, location determining aspects/devices/modules and/or one or more communications interfaces. For example, a carrier system 300 may include one or more Cathay Pacific's computer systems, one or more hand held delivery information/data acquisition devices, one or more handheld and/or automatic devices configured for scanning the package barcodes as the package flows through its supply chain "life cycle", and/or the like. In various embodiments, a carrier system 300 may communicate or interact with any number of launch systems 100 and/or other carrier systems 300 via their respective communication interfaces information/data. This may also enable the carrier system 300 to communicate with various other computing entities, such as user computing entities 30, customer systems 200, and/or various other computing entities. In some embodiments, a carrier system 300 may comprise automated conveyor belts, devices configured for scanning products, packages, parcels, shipments, items, and/or the like and/or shipping documents and/or shipping labels associated therewith, devices for printing shipping labels for and/or affixing shipping labels to one or more products, packages, parcels, shipments, items, and/or the like, components for processing one or more products, packages, parcels, shipments, items, and/or the like, components configured to provide visibility and/or tracking information/data to one or more user computing entities 30, components for coordinating one or more delivery and/or pick-up routes, and/or the like. As will be recognized, these architectures and descriptions are provided for exemplary purposes only and are not limiting to the various embodiments.

5. Customs Computing System 80

In one embodiment, a customs office, organization, and/or the like and/or officers and/or agents of the customs office, organization, and/or the like may operate one or more customs computing systems 80. A customs computing system 80 may include one or more components that are functionally similar to those of the launch system 100 and/or the user computing entity 30. For example, in one embodiment, each customs computing system 80 may include one or more processing elements (e.g., CPLDs, microprocessors, multi-core processors, coprocessing entities, ASIPs, microcontrollers, and/or controllers), one or more display device/input devices (e.g., including user interfaces), volatile and non-volatile storage or memory, and/or one or more communications interfaces. For example, a customs computing system 80 may communicate or interact with any number of launch systems 100, customer systems 200, and/or carrier systems 300 via their respective communication interfaces information/data. This may also enable the customs computing system 80 to provide information/data related to customs rules, regulations, and/or laws, provide one or more forms related to customs brokerage, receive one or more filled out forms related to customs brokerage, receive one or more fees related to customs brokerage, and/or the like. As will be recognized, these architectures and descriptions are provided for exemplary purposes only and are not limiting to the various embodiments.

III. Exemplary System Operation

Figure 4:
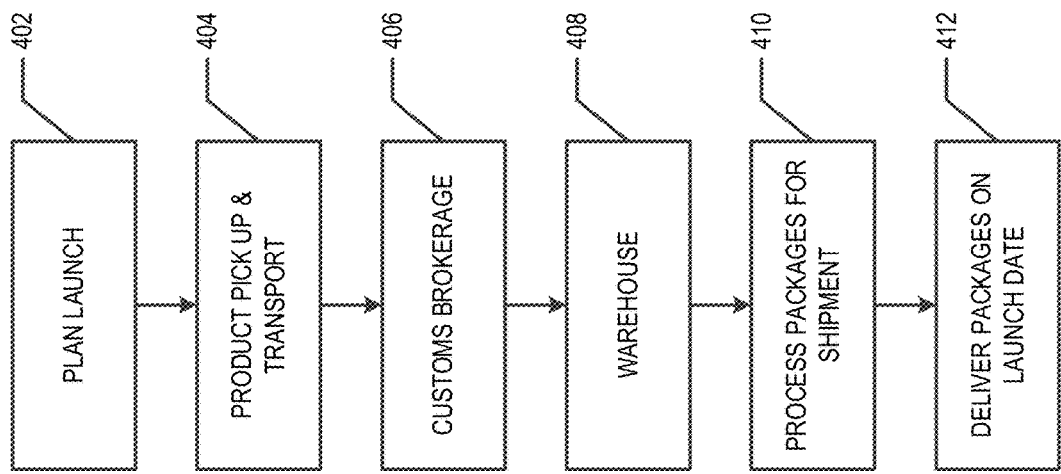
FIG. 4 is a flowchart illustrating operations and processes that can be used in the planning and conducting of a product launch in accordance with various embodiments of the present invention.

FIG. 4 provides a flowchart of various processes and operations that may be completed in accordance with various embodiments of the present invention. At step 402, a product launch plan is generated and/or determined (e.g., via the planning module 130 and/or the like). In various embodiments, the product launch plan may be generated and/or determined based on a variety of planning parameters. In various embodiments, the planning parameters may include one or more of the product launch date, the size and weight of the product and its packaging, size and weight of a pallet/cube of the product, number of product per package/pallet/cube, the target market of the launch (e.g., city, county, state, region, country, continent, North American Free Trade Agreement (NAFTA) countries, Eurozone countries, global market, and/or the like), where the product is manufactured and/or packaged, warehousing requirements of the product and/or packaging (e.g., if the product should be kept in a particular temperature range, humidity level, and/or the like), security concerns, relevant customs regulations, expected size of launch (e.g., number of products required for the launch date), forecasts related to geographic spread of product launch (e.g., number of products required for various regions of the target market), length of manufacturing and/or packaging process, supply chain logistics for manufacturing and/or packaging process, transportation network constraints (e.g., number of available trucks, trailers, airplanes, trains, or cargo containers, size and weight restrictions of available trucks, trailers, airplanes, trains, or cargo containers, available warehouse space, and/or the like), package visibility concerns within the transportation network (e.g., particular packaging for products and/or shipments of products for product launch, package tracking visibility for consignees, and/or the like) and/or the like. In various embodiments, planning parameters may further comprise launch strategy parameters including channels used for the product launch (retail locations operated by the company launching the product, third party retail locations, direct to consumer, and/or the like), if the product launch date will depend upon channel, geographic region of the target market, and/or the like, information/data related to the product distribution plan, delivery preferences (e.g., signature requirement, tracking visibility, consignee services such as notifications prior to delivery and/or consignees being able to request delivery window, cash on delivery (COD) and/or the like).

In various embodiments, a product launch date may be a date on which a plurality of the product are to be delivered to a plurality of customers. The plurality of customers (e.g., consumers and retailers) may be located in various geographic locations (e.g., different zip codes, cities, states, regions of the country, countries, continents, and/or the like). Some customers (e.g., retailers) may receive a plurality of the product (e.g., one or more pallets, group of packages, and/or the like) by freight delivery. Other customers (e.g., consumers) may receive one or more of the product. For example, a customer may order a product for each of him or herself, his or her significant other, and each of their three kids while another customer may order only one of the product. Deliveries of these smaller numbers of the product may be made by non-freight delivery.

In various embodiments, the desired product launch date may be selected and the logistics of the product launch may be planned backward from the desired product launch date to the present date. In other embodiments, the desired product launch date may be chosen based on planning forward based on the time required to manufacture and package the products for the product launch, transport the products for the product launch, and/or the like. For example, in various embodiments, a customer (e.g., operating a customer system 200) or a carrier personnel (e.g., operating a carrier system 300) may provide input of one or more planning parameters. For example, the launch system 100 (e.g., via a terminal associated with the launch system 100, a customer system 200, or a carrier system 300) may request information/data related to one or more planning parameters and/or provide a form wherein a personnel member of the customer, carrier, and/or an agent thereof may input one or more planning parameters. FIG. 5 illustrates an example view of a product planning user interface that may be used to request information/data related to one or more planning parameters via a launch system 100, customer system 200, and/or carrier system 300. The launch system 100 may receive the one or more planning parameters.

FIG. 6 provides a schematic flowchart illustrating how, in one embodiment, the launch system 100 may use the planning parameters to generate and/or determine a product launch plan and/or the like. In various instances, the launch system 100 may receive information/data related to various planning parameters from one or more customer personnel operating customer systems 200, one or more carrier personnel operating carrier systems 300, accessing one or more databases or other information/data storage structures stored on a customer system 200, a carrier system 300, customs computing system 80 and/or other computing system (e.g., a computing system operated by a supplier of the company manufacturing the product, and/or the like), and/or receiving information/data automatically provided by the customer system 200, a carrier system 300, customs computing system 80 and/or other computing system (e.g., a computing system operated by a supplier of the company manufacturing the product and/or the like).

At step 502, the launch system 100 may receive one or more planning parameters related to the manufacturing supply chain for the product. For example, a user operating a customer system 200 may indicate that each week supplies should be delivered to the manufacturing facility for manufacturing 25,000 of a product. At step 504, the launch system 100 may receive one or more planning parameters related to the length of time needed to manufacture and/or package the product. For example, on a normal work day, 5,000 of a product may be manufactured and packaged. In another example, on normal work day, 5,000 of an product may be manufactured, and the product may be sterilized (e.g., if the product is a medical product) or may have other processes performed upon the manufactured product in lots of 12,000 products and the sterilization or other process may take 36 hours to complete.

In various embodiments, the launch system 100 may use the planning parameters related to the supply chain and the manufacturing and packaging process to estimate and/or determine the time needed to manufacture and/or package the desired number of products for the product launch date. For example, in the above example where supplies for manufacturing 25,000 products are delivered per week and 5,000 products may be manufactured on a normal work day, it would take approximately 40 work days to manufacture 200,000 of the product. The launch system may then take into account information/data related to holidays and/or efficiency parameters to determine when the 200,000 products may be manufactured, and/or the like. For example, a particular manufacturing facility may be able to produce 5,000 of the product on 95% of work days. However, on 3% of work days, the facility may only produce 4,000 of the product and on 2% of work days, the facility may only produce 3,000 of the product. In various embodiments, the launch system 100 may be configured to take these efficiency parameters into account when generating and/or determining the product launch plan.

At step 506, the launch system 100 may receive one or more planning parameters related to the onsite and/or local warehousing capabilities of the manufacturing facility. In various situations, a manufacturing facility may also include a warehouse or be located near a warehouse, or the manufacturing company may own or rent a warehouse where products may be warehoused after the manufacturing and/or packaging processes are completed and before the products are picked up by the carrier or an affiliate of the carrier. For example, the manufacturing facility may only be able to house 50,000 of the product at one time. Therefore, the carrier or an affiliate of the carrier may need to plan to pick up and transport the products periodically, regularly, and/or as required to ensure the manufacturing facility may continue to manufacture the product without overflowing the onsite and/or local warehousing capabilities of the manufacturing facility. In various scenarios, the manufacturing facility may have sufficient onsite and/or local warehousing capabilities or may be able to temporarily expand the onsite and/or local warehousing capabilities such that a significant fraction and/or all of the products for the product launch may be stored onsite and/or locally. In such scenarios, the carrier or an affiliate of the carrier may need to schedule for specific pick-up and transportation events. Planning of pick up and transportation may include determining a date for pick-up, the number of trucks, trailers, and/or the like needed to pick up and transport the products ready for pick-up, and alternative pick-up and transportation plans in the case of an issue arising, and/or the like.

At step 508, the launch system 100 may receive one or more planning parameters related to transporting the products to the target market for the product launch. For example, in one scenario, a product may be manufactured in China and the target market for the product launch may be the United States. Thus, the carrier and/or an affiliate of the carrier may need to pick up the products for the product launch and transport them to one or more local hubs in China, at step 508*a*. The products may then be transported from the one or more local hubs in China to one or more market hubs in the United States, at step 508*b*. Herein, a local hub is a transportation hub associated with the carrier and/or an affiliate of the carrier and located near the manufacturing facility and/or local warehouse. A market hub is a transportation hub associated with the carrier and/or an affiliate of the carrier located within the target market for the product launch. The carrier and/or an affiliate of the carrier may also need to broker the products for the product launch through customs, at step 508*c*. In various embodiments, the customs brokerage may occur before, after, and/or during the transportation of the products from the local hub to the market hub. In some circumstances, customs brokerage may not be necessary. For example, if the products are manufactured in the state of Georgia and the target market is the United States, customs brokerage may not be required.

In various embodiments, the launch system 100 may be configured to determine which modes of transportation to use to transport the products for the product launch from the pick-up site to the local hub, from the local hub to the market hub, from the market hub to the various delivery locations, and/or the like. For example, if a pick-up is scheduled two months before the product launch date, that set of products may be transported in a shipping container from the local hub to the market hub via a trailer to a train yard near the local hub, a train to a shipping port, a ship to another shipping port, a train to a train yard near the market hub, and a trailer to the market hub. A similarly sized set of products picked up one week before the product launch date may be transported from the local hub to the market hub via an airplane. The launch system 100 may consider a variety of planning parameters to determine which modes of transportation to use for transporting products from the pickup site to the local hub, from the local hub to the market hub, and from the market hub to the delivery locations. The launch system 100 may be configured to access information/data related to the availability and restrictions related to various modes of transportation (e.g., from the parameters database 140, another computing system, and/or the like).

The launch system 100 may consider various planning parameters in planning the transportation of products from the manufacturing facility or local warehouse to the target market, such as the number of trailers, shipping containers, trucks, airplanes, and/or the like to be used at particular times for transporting packages, pallets, cubes, and/or the like of the product. For example, the size and weight of the product and how the products are placed upon a pallet may be used to determine how many pallets may be loaded into a particular trailer, truck, shipping container, ship, train, airplane hold, and/or the like. The launch system 100 may also access and/or receive information/data related to the size and weight capabilities of various trailers, trucks, shipping containers, ships, train cars, airplane holds, and/or the like. The launch system 100 may be configured to access and/or receive information/data related to the availability of various trailers, trucks, shipping containers, ships, trains, airplanes, and/or the like and reserve various trailers, trucks, shipping containers, ships and/or cargo space on ships, trains and/or cargo space on trains, airplanes and/or cargo space on airplanes, and/or the like for transporting the products for the product launch from the manufacturing facility or local warehouse to the local hub and/or to the market hub. The dates for which the availability of various modes of transporting the products for the product is considered and/or reservations are made is based at least in part on the planning parameters received and/or accessed in at least some of steps 502-506.

In various embodiments, the launch system 100 may be configured to plan for and/or initiate customs brokerage at step 508*c*. For example, the launch system 100 may receive and/or access information/data related to the applicable customs rules, regulations, laws, and/or the like for transporting the particular product from the location of the manufacturing facility and/or local warehouse to the market warehouse so that the products may be distributed within the target market (e.g., export rules, regulations, and/or laws related to the jurisdiction where the products were manufactured and import rules, regulations, and/or laws related to the jurisdiction of the target market), possibly via one or more customs computing systems 80, parameter database 140, and/or the like. For example, the launch system 100 may be configured to automatically fill out one or more forms related to customs brokerage, submit one or more forms related to customs brokerage, pay one or more fees related to customs brokerage, and/or the like.

In various embodiments, the launch system 100 may receive and/or access planning parameters related to warehousing the products in the target market. For example, the launch system 100 may consider the warehousing capabilities of one or more carrier hubs located in the target market. The launch system 100 may also be configured to take into consideration special handling instructions for various products (e.g., if a product should be stored in a particular temperature or humidity range, if the product is fragile, and/or the like) or security concerns. In various embodiments, the special handling instructions and/or security concerns may need to be taken into account when planning the transportation of the products for the product launch as well. For example, a particular product may need to be stored and/or transported in a humidity controlled warehouse and transportation device. Thus, in some embodiments, when checking the availability of and making reservations for warehousing space, trailers, trucks, shipping containers, ships, trains, airplanes, and/or the like, only humidity controlled options (and/or other options that fulfill the special handling instructions) may be considered.

At step 510, the launch system 100 may receive and/or access one or more planning parameters related to processing the products at the one or more market hubs. For example, information/data related to the processing capabilities of the market hub may be considered. For example, the market hub may be capable of processing 200,000 products, pallets/cubes of the product, and/or shipments/orders of the product in one day. In various embodiments, processing may include packaging products (e.g., products may be shipped to the target market in bulk packaging/crates/boxes/etc. and then processed into individual shipments and/or orders), printing and/or affixing shipping labels to product packaging, organizing individual shipments and/or orders of products to be transported to the appropriate delivery location, and/or the like. The launch system 100 may be configured to determine a plan for the order in which products or shipments/orders of products are to be processed and to complete the processing of products and/or shipments of products such that the carrier may deliver the product and/or shipments of products on the product launch date.

At step 512, the launch system 100 may receive and/or access one or more planning parameters related to the time needed to transport products from the market hub to various delivery locations and the resources required therefor. For example, one goal of the product launch may be to deliver products to consignees throughout the target market on the launch date. Thus, if the target market is the United States, consignees in Alaska, Florida, and Tennessee should receive deliveries of the product on the same day. This may require that deliveries of the product bound for different regions of target market be processed on different days. Various forecasts may be considered to estimate how many shipments, orders, and/or products are expected to be delivered to various regions of the market on the product launch date. Based on one or more forecasts, the launch system 100 may access the availability of and/or make reservations for one or more trailers, trucks, cargo containers, ships, trains, airplanes, and/or the like to transport individual shipments and/or orders of products from one or more market hubs to one or more hubs near the delivery location of the individual shipments and/or orders such that the individual shipments and/or orders may all be delivered on the product launch date.

In various embodiments, the launch system 100 may be configured to conduct various planning steps (e.g., steps 502-512) in various orders to determine a soonest possible product launch date and/or if it is possible for a particular date to be the product launch date (e.g., if there is enough time before the desired product launch date to complete the manufacturing and/or transporting of the products for the product launch, and/or the like). In various embodiments, the launch system 100 may be configured to receive a product launch date via user input (e.g., via a customer system 200, a carrier system 300, and/or the like). The launch system 100 may be configured to plan backward from the product launch date based on various planning parameters when making reservations for transportation of the products for the product launch and planning the processing and warehousing of the products for the product launch.

In various embodiments, the launch system 100 may be further configured to plan for various visibility options. For example, the customer may request (e.g., via a customer system 200) to control the visibility of shipments/orders. For example, the carrier system 300 may provide a portal, website, and/or the like which may be accessed by a user computing entity 30 to receive package/shipment/order tracking and/or delivery information. The launch system 100 may be configured to generate and/or determine a launch plan comprising customization the visibility of tracking information/data for users. For example, in one product launch, the tracking information/data provided by a carrier system 300 to a user (e.g., operating a user computing entity 30) may depend on if the user is a consumer, a retailer, and/or the like, if the shipment/order associated with the user has been processed yet, if the product is out for delivery, and/or the like. In various embodiments, the product launch plan may include a variety of customized visibility options, as appropriate for various applications.

In various embodiments, the launch system 100 may be configured to check for planning parameters updates and/or may receive one or more planning parameter updates. In various embodiments, after receiving and/or accessing one or more planning parameter updates, the launch system 100 may be configured to update the product launch plan and/or determine if it is still possible for the individual shipments and/or orders of the product to be delivered on the product launch date. Various reservations may be modified as necessary. If the launch system 100 determines that it may not be possible to deliver one or more of the individual shipments and/or orders of the product on the product launch date, one or more notifications and/or warnings may be provided (e.g., via the launch system 100, the customer system 200, and/or the carrier system 300). In various embodiments, the product launch plan generated and/or determined by the launch system 100 may further comprise a contingency plan. It should be understood that not all of the planning parameters discussed herein may be used and/or relevant to every embodiment. Additionally, in some embodiments, additional planning parameters may be required and/or considered when planning a product launch.

In various embodiments, the product launch plan may comprise a configurable visibility threshold point. For example, when execution of the product launch plan is at a point before the configurable visibility threshold point, a customer seeking tracking information/data for a product to be delivered to the customer may simply be provided a message indicating the expected delivery date of the product (e.g., the product launch date) and not indicate the current location of the product. In example embodiments, if the customer requests tracking information/data for a product to be delivered to the customer is received after the execution of the product launch plan has reached the configurable visibility threshold point, the customer may be provided with tracking information/data for the product (or a package, item, etc. comprising the product). In various embodiments, the configurable visibility threshold point for customers receiving the product by freight delivery may be different and/or earlier in the product launch plan than the configurable visibility threshold point for customers receiving the product by non-freight delivery. Not providing the tracking information/data before the execution of the product launch plan reaches the configurable visibility threshold point may be configured to increase the security of the product during execution of the product launch plan and/or to manage customer expectations of delivery of the product. Thus, in various embodiments, the configurable visibility threshold point may be after the processing of individual shipments of the product, after the product has cleared customs (e.g., after products to be provided to the market comprising the customer have cleared customs), after the warehousing of the product at one or more market hubs and/or one or more central hubs has been completed (e.g., when the product is removed from the warehouse for further processing and transportation), a predetermined time period before the launch date (e.g., a day, a few days, a week, and/or the like before the launch date), and/or the like.

Returning to FIG. 4, at step 404, the products may be picked up from the manufacturing facility and/or local warehouse by the carrier and/or an affiliate of the carrier in accordance with the product launch plan generated by the launch system 100. For example, as noted above, the carrier and/or an affiliate of the carrier may make daily, weekly, biweekly, monthly and/or the like pick-ups to transport the products from the manufacturing facility and/or the local warehouse to one or more local hubs. In other scenarios, specific pick-ups may be scheduled rather than periodically or regularly scheduled. The products may then be transported to the local hub and then transported to the market hub, in accordance with the product launch plan generated by the launch system 100.

In various embodiments, the launch system 100 may receive updates throughout the transportation of the products. For example, in one embodiment, the launch system 100 may be notified (e.g., by a carrier system 300 and/or the like) upon a product pick-up, when picked up products are delivered to the local hub, when products leave the local hub and/or reach the market hub, when products leave the market hub, and/or the like. The received updates may comprise information/data related to the number of product/packages/pallets/cubes of the product, the mode of transportation used, date and time stamps for product pick-up or arrival at a location, security information/data, environmental information/data related to the transportation of the product (e.g., temperatures experienced, humidity levels experienced, levels of physical shock experienced when going over bumps in the road, speed bumps, loading and unloading, etc. and/or the like) and/or the like. It should be understood that various methods for tracking one or more pallets, shipments, boxes, crates, and/or the like of products may be used in accordance with various embodiments of the present invention. The launch system 100 may monitor the product launch based on the provided updates and/or may generate and/or determine one or more modified product launch plans, possibly in response to a provided update.

At step 406, the launch system 100 may be configured to broker the products for the product launch, and/or a subset thereof, through customs. For example, as noted above, the launch system 100 may be configured to automatically access and/or request customs information/data related to the product and/or the product launch, fill out one or more customs forms, submit one or more customs forms, pay one or more customs fees, and/or the like (e.g., via communication with one or more customs computing systems 80). In various embodiments, the launch system 100 may broker all of the products for the product launch through customs at once. In other embodiments, the launch system 100 may broker the products of each individual shipment or order through customs separately. In still other embodiments, the launch system 100 may broker the products aboard each airplane, ship, train, and/or the like through customs individually (e.g., if an airplane is carrying five pallets of products for the product launch, those five pallets of products may be brokered through customs together and separately from other products). In yet other embodiments, the launch system 100 may broker all the products leaving the local hub and/or expected at the market hub on the same day or in the same week. For example, two airplanes and a ship carrying products for the product launch may leave the local hub on the same day and the products being carried by the two airplanes and the ship may be brokered through customs together.

At step 408, the products may be warehoused at one or more market hubs in accordance with the product launch plan generated by the launch system 100. For example, the products may be stored in a warehouse associated with a market hub in accordance with any special handling instructions (e.g., storage temperature range, humidity range, and/or the like). The products may be secured within the warehouse and/or security concerns may be addressed. At step 410, individual shipments and/or orders of products may be processed. For example, a retailer may order 500 of a product for the product launch date and an individual may order a single product to be delivered to his or her home. The products may be delivered to the market hub and warehoused on pallets/cubes and/or in bulk shipping containers, crates, and/or the like. Processing the products may include preparing individual shipments and/or orders for shipment, generating, printing, and/or affixing shipping labels to individual shipments and/or orders, organizing transportation of the individual shipments and orders to their respective delivery locations, and/or the like.

In various embodiments, all of the products for the product launch may be warehoused at a central market hub until it is time for the products to be transported for delivery. In some embodiments, a central market hub may be used as a staging location wherein all of the products for the product launch may all be warehoused and/or processed at a central market hub. The products may either be held at the central market hub until being transported for delivery or may be transported to and stored at a warehouse and/or market hub closer to the delivery location for that particular product. The central market hub need not be centrally located within the market. Herein, the central market hub refers to a hub used to warehouse and/or process a significant fraction and/or all of the products for the product launch. For example, in one embodiment, all the products for the product launch may be warehoused and/or processed at a central hub located near Louisville, Ky., until the products are transported for delivery. In another example, all the products for the product launch may be warehoused and/or processed through the central hub located near Louisville, Ky., and a short time before the product launch date (e.g., 1 week, a few days, and/or the like before the product launch date) the products that are to be delivered to addresses in Georgia may be transported to a market hub near Atlanta, Ga., products that are to be delivered to addresses in Northern California may be transported to a market hub near Sacramento, Calif., products that are to be delivered to addresses in Southern California may be transported to a market hub near Los Angeles, Calif., and/or the like. Security concerns, special handling instructions, customs regulations, rules, and/or laws, product and packaging weight and/or size, forecasted weather events, and/or the like may be considered in planning when to transport the products for the product launch from the central market hub. In various other embodiments, a central market hub may not be used and/or products for the product launch may be warehoused and/or processed in market hubs located near the delivery address for the product.

In various embodiments, the launch system 100 may use one or more planning parameters to determine the processing capabilities of a central market hub. For example, it may be desired to process the products/shipments/orders for the product launch in a single day. Thus, the launch system 100 may determine if the central market hub is capable of processing all of the products/shipments/orders for the product launch in a single day. The launch system 100 may also determine if additional personnel and/or equipment may be needed to process the products/shipments/orders for the product launch in the allotted time frame. In some embodiments, the launch system 100 may use one or more planning parameters to determine and/or estimate the amount of time needed to process all of the products/shipments/orders for the product launch at the central market hub.

In various embodiments, the launch system 100 may be configured to organize the processing of products/shipments/orders such that products/shipments/orders are prepared to depart the central market hub in the order required by the time needed to transport those products/shipments/orders to their delivery locations. The launch system 100 may also be configured to schedule, secure, reserve, and/or contract the necessary transportation resources (e.g., trucks, trailers, trains, shipping containers, ships, airplanes, and/or the like). The launch system 100 may also provide information/data to carrier personnel to ensure each transportation resource receives the scheduled products/shipments/orders. For example, the launch system 100 may provide carrier personnel with the information/data necessary to ensure all of the products/shipments/orders that should be loaded onto a particular trailer, airplane, and/or the like are properly loaded before the trailer, airplane, and/or the like departs the central market hub. The launch system 100 may also be configured to coordinate the arrival and departure of transportation resources from the central market hub to ensure a smooth traffic flow in and around the central market hub.

During the processing and transportation of products in preparation for the product launch, a user (e.g., operating a user computing entity 30) may access a carrier system 300 to view tracking information/data related to that user's order of one or more products to be delivered on the product launch date. The carrier system 300 may be configured to provide customized visibility for products to be delivered as a part of the product launch. For example, if products to be delivered in Georgia are transported to a market hub near Atlanta, Ga., one week before the launch date, this may not be indicated by the tracking information/data provided by the carrier system 300 to the user computing entity 30 to prevent a user with a delivery address in Atlanta, Ga., from expecting to receive their product early, for example. In some embodiments, different tracking information/data available to a user may be provided depending on the type of shipment/order associated with the user. For example, a user associated with a freight shipment, trailer load shipment, and/or the like may have access to more tracking information/data and/or expected delivery time information/data (e.g., so that a loading dock may be reserved and/or the like) than a user associated with a domestic small package order.

For example, a customer (e.g., operating a user computing entity 30) may, through a user interface provided by the user computing entity 30, request tracking information/data for one or more of the product to be delivered to the customer. The launch system 100 and/or carrier system 300 may receive the request for tracking information. The launch system 100 and/or the carrier system 300 may determine if the execution of the product launch plan has reached the configurable visibility threshold point of the product launch plan. If the execution of the product launch plan has reached the configurable visibility threshold point, the launch system 100 and/or carrier system 300 may provide the requested tracking information/data to be displayed by the user interface provided by the user computing entity 30. If the execution of the product launch plan has not reached the configurable visibility threshold point, the launch system 100 and/or carrier system 300 may provide a message indicating that the product is expected to be delivered on the launch date. The message may be configured to be displayed by the user interface provided by the user computing entity 30.

At step 412, the products for the product launch are delivered on the predetermined product launch date. Some shipments and/or orders may include a single product delivered to a residential address. Some shipments and/or orders may be trailer load, partial trailer load, and/or one or more pallets or cubes of a product delivered to a retail location, warehouse, business address, and/or the like. Thus, various shipments and/or orders may be delivered as a part of a normal delivery route while other shipments and/or orders may require specifically planned package deliveries, freight deliveries, and/or the like. During the planning process, the launch system 100 may use one or more planning parameters to determine where normal delivery routes may be used to deliver shipments and/or orders of the product and where specifically planned deliveries may be used. For example, if delivering products for the product launch via the normal delivery route would increase the usual load for the normal delivery route by five packages and the additional five packages are expected to fit in the delivery vehicle, those shipments and/or orders may be delivered via the normal delivery route. If delivering the products for the product launch via the normal delivery route would greatly increase the number of packages for that delivery route and/or would not fit in the delivery vehicle, additional delivery routes may be added. For example, the launch system 100 and/or the carrier system 300 may determine that due to the increase in packages related to the product launch on the product launch date for two normal delivery routes located near each other, the two normal delivery routes may be serviced by three delivery vehicles on the date of the product launch, and/or the like. In another example, one or more normal delivery routes may not be affected by the product launch and one or more product launch specific delivery routes may be scheduled. For larger shipments and/or orders, dedicated deliveries, freight deliveries, and/or the like may be scheduled for delivering the product on the product launch date. It should be understood that a variety of delivery methods may be used as applicable for various circumstances.

In various embodiments, the launch system 100 may receive updates regarding the manufacture, pick-up, transportation, processing, warehousing, and/or the like of products for the product launch from the customer system 200 and/or carrier system 300 regularly, periodically, on the occurrence of an event (e.g., a notification that two pallets of products have been picked up from the manufacturing facility, a notification that a shipping container of products has been delivered to the market hub, and/or the like), an event not occurring (e.g., if a pick-up of two pallets from the manufacturing facility was planned, but there weren't any pallets or only one pallet available, and/or the like), information/data received and/or accessed from one or more customs computing systems 80, and/or the like. After receiving update information, or perhaps in response thereto, the launch system may update one or more aspects of the product launch plan. In various embodiments, the product launch date may be an updateable aspect of the product launch plan. For example, before the product launch date has been finalized and/or publicized, the launch system 100 may update the product launch date based on one or more updates. The launch system 100 may be configured to receive an indication (e.g., via a customer system 200, carrier system 300, and/or the like) that the product launch date is not to be updated further. In some embodiments, the product launch date may be set as a planning parameter that cannot be updated.

In various embodiments, the products for the product launch (e.g., packages, boxes, crates, shipping containers, pallets, cubes, and/or the like containing products for the product launch) may be identified within the carrier's transportation network and carrier system 300 by a unique customer number, from/return address, and/or the like. In various embodiments, the product launch identifier may be encoded into a machine-readable index affixed to the product, package, box, item, crate, shipping container, pallet, cube, and/or the like carrying one or more products for the product launch and/or printed on associated shipping documents. For example, a barcode, two dimensional barcode, quick response (QR) code, Maxicode, radio frequency identification (RFID) tag, and/or the like may be affixed to a pallet of boxes containing products for the product launch. In this example, the barcode, two dimensional barcode, QR code, Maxicode, and/or the like may encode a product launch identifier (e.g., a unique customer number and/or the like) and/or other information/data related to that pallet of products (e.g., date of pick-up from manufacturing facility, number of the pallet in a set of pallets, date arrived at and/or departed from the local hub, and/or the like).

V. Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method comprising:
determining, via a processor, a launch date for a product launch, wherein a plurality of a product is to be delivered to a plurality of customers at different geographic locations on the launch date;
receiving, via the processor accessing a database, one or more planning parameters for executing the product launch;
calculating, via the processor, time needed for manufacturing and packaging the plurality of the product for the product launch date;
utilizing one or more planning parameters to generate, via the processor, one or more components of a product launch plan associated with the product launch;
generating, via the processor, the product launch plan for delivering the plurality of the product to the plurality of customers based on the one or more planning parameters to different geographic locations by working back from the launch date, wherein the product launch plan comprises a configurable visibility threshold point and one or more customized visibility options regarding tracking information for the plurality of products provided, via a portal, to the plurality of customers for controlling the visibility of product tracking information;
utilizing, via the processor, one or more planning parameters to determine processing capabilities of a central market hub;
determining, via the processor, an amount of time needed to process one or more products of the plurality of products by the determined launch date at the central hub;
determining, via the processor, whether or not additional personnel or equipment are needed to process the plurality of products for the product launch by the determined launch date;
executing, via the processor, the product launch plan and tracking one or more of the plurality of the product as the one or more of the plurality of the product is transported in accordance with the product launch plan;
receiving, via the processor, a tracking request from one of the plurality of customers who is an intended recipient of at least one of the one or more of the plurality of the product, the tracking request provided as user input to a user interface provided through a customer computing entity;
determining, via the processor, whether the execution of the product launch plan has reached the configurable visibility threshold point;
responsive to determining that the execution of the product launch plan has reached the configurable visibility threshold point, providing tracking information to be displayed by the user interface provided by the customer computing device; and
responsive to determining that the execution of the product launch plan has not reached the configurable visibility threshold point, transmit signaling information to a receiver, to provide a message (a) to be displayed by the user interface provided by the customer computing entity and (b) indicating that the expected delivery date of the at least one of the one or more of the plurality of the product is the launch date.

2. The method of claim 1, wherein:
the plurality of customers comprises (a) freight customers receiving one or more of the plurality of the product by a freight delivery and (b) non-freight customers receiving one or more of the plurality of the product by a non-freight delivery; and
the product launch plan comprises (a) a configurable visibility threshold point for freight customers and (b) a different configurable visibility threshold point for non-freight customers.

3. The method of claim 2, wherein the configurable visibility threshold point for freight customers occurs earlier in the execution of the product launch plan than the configurable visibility threshold point for non-freight customers.

4. The method of claim 1, wherein the configurable visibility threshold point is after the processing of individual shipments.

5. The method of claim 1, wherein the configurable visibility threshold point is after the product has cleared customs.

6. The method of claim 1, wherein the configurable visibility threshold point is after the warehousing the product at one or more market hubs, central hubs, or both.

7. The method of claim 1, wherein the configurable visibility threshold point is a predetermined time period before the launch date.

8. An apparatus comprising at least one processor and at least one memory storing computer program code, the at least one memory and the computer program code configured to, with the processor, cause the apparatus to at least:
determine, via a processor, a launch date for a product launch, wherein a plurality of a product is to be delivered to a plurality of customers at different geographic locations on the launch date;
receive, via the processor that accesses a database, one or more planning parameters for executing the product launch;
calculate, via the processor, time needed for manufacturing and packaging the plurality of product for the product launch date;
utilize one or more planning parameters to generate, via the processor, one or more components of a product launch plan associated with the product launch;

generate, via a processor, the product launch plan for delivering the plurality of the product to the plurality of customers based on the one or more planning parameters to different geographic locations by working back from the launch date, wherein the product launch plan comprises a configurable visibility threshold point and one or more customized visibility options regarding tracking information for the plurality of product provided, via a portal, to the plurality of customers for controlling the visibility of product tracking information;

utilize, via the processor, one or more planning parameters to determine processing capabilities of a central market hub;

determine, via the processor, an amount of time needed to process one or more products of the plurality of products by the determined launch date at the central hub;

determine, via the processor, whether or not additional personnel or equipment are needed to process the plurality of products for the product launch by the determined launch date;

execute, via the processor, the product launch plan and track one or more of the plurality of the product as the one or more of the plurality of items is transported in accordance with the product launch plan;

receive, via the processor, a tracking request from one of the plurality of customers who is an intended recipient of at least one of the one or more of the plurality of the product, the tracking request provided as user input to a user interface provided through a customer computing entity;

determine, via the processor, whether the execution of the product launch plan has reached the configurable visibility threshold point;

responsive to determining that the execution of the product launch plan has reached the configurable visibility threshold point, provide tracking information/data to be displayed by the user interface provided by the customer computing device; and responsive to determining that the execution of the product launch plan has not reached the configurable visibility threshold point, transmit signaling information to a receiver, to provide a message (a) to be displayed by the user interface provided by the customer computing entity and (b) indicating that the expected delivery date of the at least one of the one or more of the plurality of the product is the launch date.

9. The apparatus of claim 8, wherein:
the plurality of customers comprise (a) freight customers receiving one or more of the plurality of the product by a freight delivery and (b) non-freight customers receiving one or more of the plurality of the product by a non-freight delivery; and
the product launch plan comprises (a) a configurable visibility threshold point for freight customers and (b) a different configurable visibility threshold point for non-freight customers.

10. The apparatus of claim 9, wherein the configurable visibility threshold point for freight customers occurs earlier in the execution of the product launch plan than the configurable visibility threshold point for non-freight customers.

11. The apparatus of claim 8, wherein the configurable visibility threshold point is after the processing of individual shipments.

12. The apparatus of claim 8, wherein the configurable visibility threshold point is after the product has cleared customs.

13. The apparatus of claim 8, wherein the configurable visibility threshold point is after the warehousing the product at one or more market hubs, central hubs, or both.

14. The apparatus of claim 8, wherein the configurable visibility threshold point is a predetermined time period before the launch date.

15. A computer program product comprising at least one non-transitory computer-readable storage medium having computer-executable program code instructions stored therein, the computer-executable program code instructions comprising program code instructions configured to:

determine, via a processor, a launch date for a product launch, wherein a plurality of a product is to be delivered to a plurality of customers at different geographic locations on the launch date;

receive, via the processor that accesses a database, one or more planning parameters for executing the product launch, calculate, via the processor, time needed for manufacturing and packaging the plurality of product for the product launch date;

utilize one or more planning parameters to generate, via the processor, one or more components of a product launch plan associated with the product launch;

generate, via the processor, the product launch plan for delivering the plurality of the product to the plurality of customers based on the one or more planning parameters to different geographic locations by working back from the launch date, wherein the product launch plan comprises a configurable visibility threshold point and one or more customized visibility options regarding tracking information for the plurality of products provided, via a portal, to the plurality of customers for controlling the visibility of product tracking information;

utilizing, via the processor, one or more planning parameters to determine processing capabilities of a central market hub;

determining, via the processor, an amount of time needed to process one or more products of the plurality of products by the determined launch date at the central hub;

determining, via the processor, whether or not additional personnel or equipment are needed to process the plurality of products for the product launch by the determined launch date;

execute, via the processor, the product launch plan and track one or more of the plurality of the product as the one or more of the plurality of the product is transported in accordance with the product launch plan;

receive, via the processor, a tracking request from one of the plurality of customers who is an intended recipient of at least one of the one or more of the plurality of the product, the tracking request provided as user input to a user interface provided through a customer computing entity;

determine, via the processor, whether the execution of the product launch plan has reached the configurable visibility threshold point;

responsive to determining that the execution of the product launch plan has reached the configurable visibility threshold point, provide tracking information/data to be displayed by the user interface provided by the customer computing device; and responsive to determining that the execution of the product launch plan has not reached the configurable visibility threshold point, transmit signaling information to a receiver, to provide a message (a) to be displayed by the user interface provided by the customer computing entity and (b) indicating that the expected delivery date of the at least one of the one or more of the plurality of the product is the launch date.

16. The computer program product of claim 15, wherein:

the plurality of customers comprise (a) freight customers receiving one or more of the plurality of the product by a freight delivery and (b) non-freight customers receiving one or more of the plurality of the product by a non-freight delivery; and the product launch plan comprises (a) a configurable visibility threshold point for freight customers and (b) a different configurable visibility threshold point for non-freight customers.

17. The computer program product of claim 16, wherein the configurable visibility threshold point for freight customers occurs earlier in the execution of the product launch plan than the configurable visibility threshold point for non-freight customers.

18. The computer program product of claim 15, wherein the configurable visibility threshold point is after the processing of individual shipments.

19. The computer program product of claim 15, wherein the configurable visibility threshold point is after the product has cleared customs.

20. The computer program product of claim 15, wherein the configurable visibility threshold point is after the warehousing the product at one or more market hubs, central hubs, or both.

21. The computer program product of claim 15, wherein the configurable visibility threshold point is a predetermined time period before the launch date.

* * * * *